United States Patent
Altmikus et al.

(10) Patent No.: US 10,294,924 B2
(45) Date of Patent: May 21, 2019

(54) WIND TURBINE HAVING A FIBER WINDING

(71) Applicant: Wobben Properties GmbH, Aurich (DE)

(72) Inventors: Andree Altmikus, Aurich (DE); Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 355 days.

(21) Appl. No.: 15/114,365

(22) PCT Filed: Jan. 26, 2015

(86) PCT No.: PCT/EP2015/051472
§ 371 (c)(1),
(2) Date: Jul. 26, 2016

(87) PCT Pub. No.: WO2015/113932
PCT Pub. Date: Aug. 6, 2015

(65) Prior Publication Data
US 2017/0016428 A1   Jan. 19, 2017

(30) Foreign Application Priority Data
Jan. 28, 2014   (DE) .................. 10 2014 201 507

(51) Int. Cl.
*F03D 13/20* (2016.01)
*F03D 1/06* (2006.01)

(52) U.S. Cl.
CPC .............. *F03D 13/20* (2016.05); *F03D 1/06* (2013.01); *F05B 2220/30* (2013.01);
(Continued)

(58) Field of Classification Search
CPC .......... F03D 1/06; F03D 7/0296; F03D 80/00; F03D 80/80; F03D 80/85; F03D 80/88; F03D 13/10; E04B 1/98
See application file for complete search history.

(56) References Cited

U.S. PATENT DOCUMENTS

| | | | | |
|---|---|---|---|---|
| 4,522,165 | A | * | 6/1985 | Ogawa .................... B32B 27/12 123/195 C |
| 4,527,371 | A | * | 7/1985 | Hagbjer .................... E04B 1/98 188/378 |

(Continued)

FOREIGN PATENT DOCUMENTS

| | | |
|---|---|---|
| DE | 3842026 A1 | 7/1990 |
| DE | 102005018749 B4 | 5/2007 |

(Continued)

*Primary Examiner* — Carlos A Rivera
*Assistant Examiner* — Danielle M. Christensen
(74) *Attorney, Agent, or Firm* — Seed Intellectual Property Law Group LLP

(57) ABSTRACT

A wind turbine comprising a tower and a nacelle, wherein a rotor having at least one rotor blade is disposed on the nacelle, and the rotor executes a rotary motion when the wind turbine is in operation and the rotary motion drives a generator within the nacelle, via a shaft, wherein disposed on the tower of the wind turbine there is a fiber winding, which wraps around a vertical tower axis of the tower of the wind turbine and which is configured to damp a vibration of the tower.

20 Claims, 3 Drawing Sheets

(52) U.S. Cl.
CPC . *F05B 2220/706* (2013.01); *F05B 2240/9113* (2013.01); *F05B 2280/6003* (2013.01); *Y02E 10/721* (2013.01); *Y02E 10/725* (2013.01); *Y02E 10/726* (2013.01); *Y02E 10/728* (2013.01)

(56) References Cited

U.S. PATENT DOCUMENTS

| | | | |
|---|---|---|---|
| 4,557,666 A * | 12/1985 | Baskin | F03D 1/0658 |
| | | | 416/11 |
| 6,532,700 B1 * | 3/2003 | Maliszewski | E04H 12/085 |
| | | | 52/40 |
| 7,061,133 B1 * | 6/2006 | Leijon | H02K 3/40 |
| | | | 290/44 |
| 7,144,216 B2 * | 12/2006 | Hessel | F03D 80/00 |
| | | | 415/119 |
| 7,501,798 B2 | 3/2009 | Laubrock et al. | |
| 8,878,377 B2 * | 11/2014 | Ollgaard | F03D 11/04 |
| | | | 290/44 |
| 2007/0084554 A1 * | 4/2007 | Miller | B29C 51/16 |
| | | | 156/292 |
| 2009/0211173 A1 | 8/2009 | Willey et al. | |
| 2011/0138704 A1 | 6/2011 | Bagepalli et al. | |
| 2013/0195654 A1 | 8/2013 | Berger et al. | |
| 2014/0157715 A1 | 6/2014 | Wagner | |
| 2016/0160499 A1 * | 6/2016 | Moeller | E04B 1/40 |
| | | | 52/2.11 |
| 2017/0138351 A1 * | 5/2017 | Tobinaga | F03D 80/82 |

FOREIGN PATENT DOCUMENTS

| | | |
|---|---|---|
| DE | 102007019907 B4 | 4/2009 |
| DE | 102010009863 A1 | 9/2011 |
| EP | 1533521 A1 | 5/2005 |
| JP | 2010150985 A | 7/2010 |
| WO | 2013010664 A1 | 1/2013 |

* cited by examiner

WIND TURBINE HAVING A FIBER WINDING

TECHNICAL FIELD

The invention relates to a wind turbine having a fiber winding for damping vibrations.

DESCRIPTION OF THE RELATED ART

Wind turbines, or wind power installations, comprise a tower and a nacelle that is mounted at the upper end of the tower. Also realized on the nacelle is a rotor, which rotates when the wind turbine is in operation, and which drives a generator inside the nacelle. Owing to their design, in the form of a long lever (tower) having a heavy mass (nacelle plus generator) at the end of the lever, wind turbines are susceptible to vibrations. Causes or excitation for vibration of the tower may be, for example, external forces, for example wind acting on the nacelle and tower. In addition, however, the tower may also be excited to vibrate by internal forces, for example a vibration of the generator inside the nacelle. In this case, when the excitation frequency meets a resonance frequency of the tower, the vibrations may "build up" to the extent of the so-called resonance catastrophe. In each case, vibrations result in increased loading of the material, such that fatigue phenomena, in particular (micro-) cracks, may occur in the material of the tower after just a short time.

It would therefore be desirable to provide a device and/or a wind turbine in which the vibrations of the tower of the wind turbine are suppressed and/or damped. In particular, it would be desirable to provide a device and/or a wind turbine with which the vibrations caused by the generator are damped.

Various solutions for this are known from the prior art.

Thus, for example, a device for mounting a generator in a wind turbine by means of a plurality of damping elements is known from the patent document DE 10 2005 018 749 B4. In this case, the generator feet are connected to a plate that has a plurality of damping elements, in order that the vibrations produced by the generator are not transmitted to the nacelle and/or to the tower of the wind turbine.

Moreover, the patent application DE 10 2010 009 863 A1 proposes a means for reducing the loads in the drive train of a wind turbine. In this case, vibrations in the drive train are sensed by means of a sensor and then compensated by means of an active control, in particular by means of actively controllable damping means.

A device for active damping of a drive train in a wind turbine is known from the document DE 10 2007 019 907 B4.

The solutions known from the prior art are elaborate in design, and are expensive and demanding in terms of maintenance.

BRIEF SUMMARY

Embodiments provide a device and/or wind turbine intended to provide improved damping, in particular inexpensive, low-maintenance damping, of the vibrations of a tower of the wind turbine. In particular, provided is a device and/or wind turbine with which the wind turbine vibrations produced by the generator are damped.

Provided is a wind turbine comprising a tower and a nacelle, wherein a rotor having at least one rotor blade is disposed on the nacelle, and the rotor executes a rotary motion when the wind turbine is in operation and the rotary motion drives a generator within the nacelle, via a shaft, wherein disposed on the tower of the wind turbine there is a fiber winding, which wraps around a vertical tower axis of the tower of the wind turbine and which is configured to damp a vibration of the tower. The concept of the invention is described exemplarily—without thereby limiting the invention—in the following. The invention has identified that vibrations of a wind turbine tower can be suppressed and damped by means of a fiber winding that is wound around the tower of the wind turbine. In this case, the vibration energy of the tower of the wind turbine is taken up by the fiber winding and converted, for example, into thermal energy. These and other preferred embodiments of the invention constitute subject-matter of the dependent claims and specify the wind turbine according to the invention. In particular, preferred developments constitute subject-matter of the dependent claims and detail advantageous possibilities for realizing or designing the wind turbine, explained above, within the scope of the object of the invention and in respect of further advantages.

A preferred design provides that the generator is a synchronous generator. This design takes account of the concept that wind turbines are designed with either a synchronous or an asynchronous generator, the grid connection, in particular the infeed of electric current, of the wind turbine then being effected either directly or indirectly. Direct grid connection (in the case of synchronous generators) means that the generator current is fed directly into the electricity grid, whereas indirect grid connection (in the case of asynchronous generators) means that the generator current must first be adapted to the grid current, in particular the grid frequency. The present design relates to wind turbines that comprise a synchronous generator.

Synchronous generators are designed with a generator rotor and a generator stator, the generator rotor having a magnetic field that is generated either by permanent magnets or by electromagnets. The generator stator comprises a multiplicity of coils, in particular stator windings, which are configured in such a manner that, upon a rotation of the generator rotor in the generator stator, an alternating voltage or generator current is generated, the magnitude and frequency of which is dependent on the rotational speed of the generator rotor.

For the synchronous generator, the permanent magnets in the generator rotor and the opposite, induced magnets of the generator stator poles result in a detent torque, also called "cogging". The detent torque may also be interpreted as a type of "magnetic friction" or "magnetic friction torque". The detent torque or the magnetic friction, occurring in a periodic manner during the rotation, can cause the generator to vibrate with a certain cogging frequency. The vibration of the generator may propagate or be transmitted to the wind turbine, in particular to the tower of the wind turbine, via the generator suspension, in particular via the generator feet, such that the tower is excited to vibrate.

The cogging frequency of the generator in this case depends on the number of magnetic poles in the generator, the frequency or rotational speed of the rotary motion, and the diameter of the rotor. Typically, a wind turbine rotor having a diameter of approximately 80 m rotates at a rotational speed of 20 rpm, which corresponds to a frequency of ⅓ Hz. Usually, a synchronous generator comprises approximately 150 to 180 magnetic poles, and is thus capable of generating an alternating current with a frequency of 50 Hz, and thus with the correct grid frequency. This, however, also results in an excitation frequency (cogging frequency) for a mechanical vibration of the generator, and of the wind turbine tower, of approximately 50 Hz.

These vibrations are to be damped by means of a fiber winding disposed on the tower of the wind turbine.

Preferably, one design proposes that the fiber winding be disposed at the upper end in the direction of the vertical tower axis of the tower, in particular on the uppermost tower segment. In particular, it may be provided in this case that the tower is realized with a plurality of tower segments. Preferably, the fiber winding is disposed close to the generator, i.e., preferably at the upper end of the tower, in particular at the uppermost end of the uppermost tower segment. It may also be provided, however, in another embodiment, that a plurality of fiber windings are formed, which are disposed, for example, on the first, second and/or each further tower segment. Again, in another embodiment, it may be the case that an additional fiber winding is disposed on the nacelle of the wind turbine.

It may be provided, in the case of an expedient design, that the fiber winding has a certain thickness in the radial direction in relation to the tower axis, wherein the dimension of the thickness is selected such that the vibration of the tower undergoes maximum damping, wherein the vibration is generated by a cogging frequency of the generator.

Preferably, one design provides that the thickness of the fiber winding is in a range of from 50 mm to 100 mm.

A preferred development provides that the fiber winding has a width b in the axial direction of the tower axis, wherein the dimension of the width b is selected such that the vibration of the tower undergoes maximum damping, wherein the vibration of the tower is generated by the cogging frequency of the generator.

It may be provided, in the case of an advantageous design, that the fiber winding is disposed in a recess in a surface of the tower, in particular of the uppermost tower segment, wherein the surface of the fiber winding in the radial direction in relation to the tower axis is flush with the surface of the tower. It is provided in this case, in a special manner, that the fiber winding is integrated into the tower, in particular into the uppermost tower segment, in such a manner that the fiber winding does not alter the external appearance of the tower.

A preferred development provides that the fiber winding is disposed in a recess on an inner surface of the tower, in particular of the uppermost tower segment, and the surface of the fiber winding in the radial direction in relation to the tower axis is flush with the inner surface of the tower. This embodiment may be provided as an alternative or in addition to a fiber winding on the surface of the outside of the tower. The disposition of the fiber winding inside the tower has the advantage in this case that the fiber winding cannot be seen from the outside, and thus does not alter the appearance of the wind turbine.

A development may provide that the tower segment is realized as a steel element.

Preferably, one design provides that the fiber winding is realized in the form of a fibrous composite material having a matrix and a reinforced fiber.

A preferred embodiment relates to a wind turbine having a fiber winding, in which the matrix of the fibrous composite material, its resin, is selected from one of the following materials: thermosetting resins, thermosetting plastics, synthetic resins, elastomers and/or elastomeric thermoplastics and/or the fiber winding is realized with a plurality of fiber mats. It may be provided, in a preferred design, that sandwich-core materials are used.

A further advantageous embodiment relates to a wind turbine having a fiber winding, in which the fiber winding is realized with reinforced fibers made from at least one of the following materials: glass fibers, carbon fibers, ceramic fibers, aramid fibers, boron fibers, basalt fibers, steel fibers, nylon fibers and/or natural fibers, which are oriented diagonally, parallelwise and/or perpendicularly in relation to the tower axis.

Exemplary embodiments of the invention are described in the following with reference to the figures, in comparison to the prior art, which is also represented in part. These figures are not necessarily intended as scale representations of the exemplary embodiments, but, rather, the figures are realized in a schematic and/or slightly distorted form where this is useful for explanation. With regard to information supplementing the teaching that can be obtained directly from the figures, reference is made to the relevant prior art. It must be taken into account in this case that various modifications and alterations, concerning the form and detail of an embodiment, may be made without departure from the general idea of the invention. The features of the invention disclosed in the description, in the figures and in the claims may be essential for the development of the invention, both singly and in any combination. In addition, all combinations of at least two of the features disclosed in the description, the figures and/or the claims come within the scope of the invention. The general idea of the invention is not limited to the exact form or the detail of the preferred embodiment shown and described in the following, or limited to a subject-matter that would be limited in comparison with the subject-matter claimed in the claims. In the case of specified measurement ranges, values lying within the said limits are also intended to be disclosed as limit values, and optionally applicable and claimable. For reasons of simplicity, parts that are similar or identical, or parts that are identical or similar in function, are denoted by the same references, where appropriate.

BRIEF DESCRIPTION OF THE SEVERAL VIEWS OF THE DRAWINGS

Further advantages, features and details of the invention are given by the following description of the preferred exemplary embodiments, and by the figures.

In detail, there are shown in FIG. 1 a possible embodiment of a wind turbine having a fiber winding.

DETAILED DESCRIPTION

Figure 1:
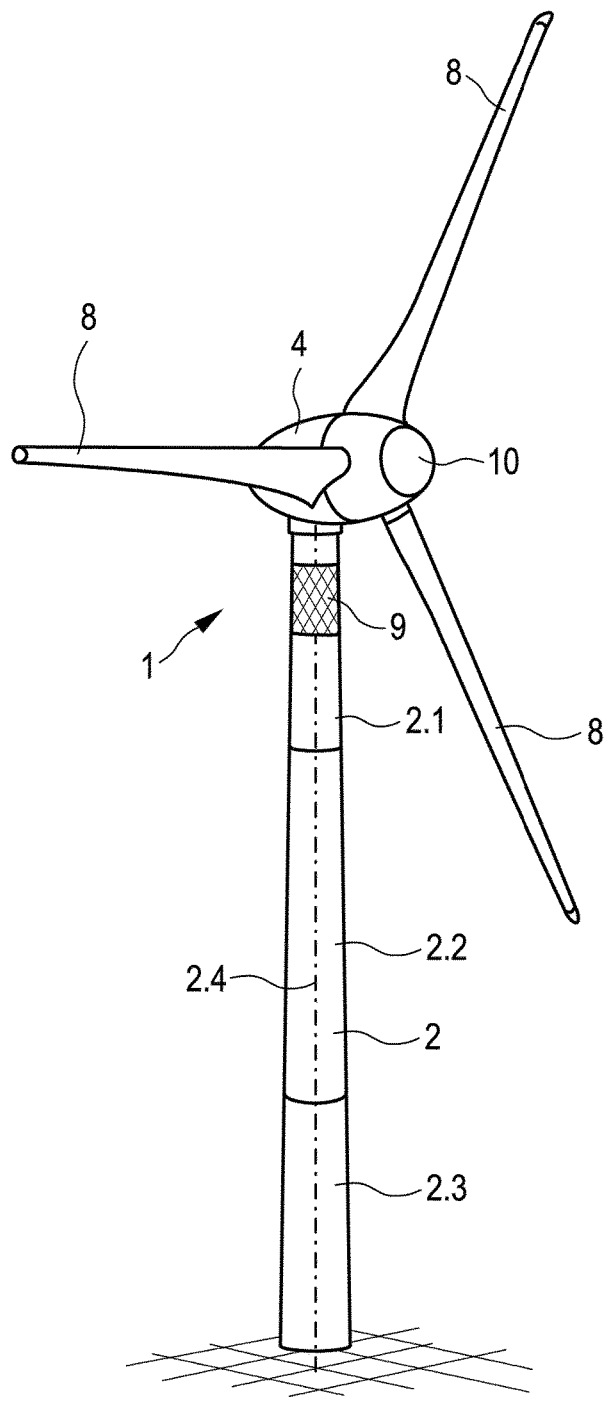

FIG. 1 shows a wind turbine 1 having a tower 2 and a nacelle 4. The tower is realized, exemplarily, with three tower segments, being a first tower segment 2.1, a second tower segment 2.2 and a third tower segment 2.3, which are disposed above one another and connected in the vertical direction of the tower axis 2.4, and which form the tower 2 of the wind turbine 1. A rotor 6, having three rotor blades 8 on a spinner 10, is disposed on the nacelle 4. When the wind turbine 1 is in operation, the rotor 6 is put into rotary motion by the wind, and drives a generator (not represented) inside the nacelle 4. By means of the generator, the mechanical energy of the rotary motion is converted into electrical energy, which can then be fed into an electricity grid.

Furthermore, the wind turbine 1 comprises a fiber winding 9, which is disposed on the tower 2 of the wind turbine 1, in particular on an uppermost tower segment 2.1. The fiber winding 9 in this case is wound around an external surface of the tower parallel to the vertical tower axis 2.2 of the tower 2 of the wind turbine 1. The fiber winding 9 is configured to suppress and/or damp a vibration of the tower 2.

Figure 2:
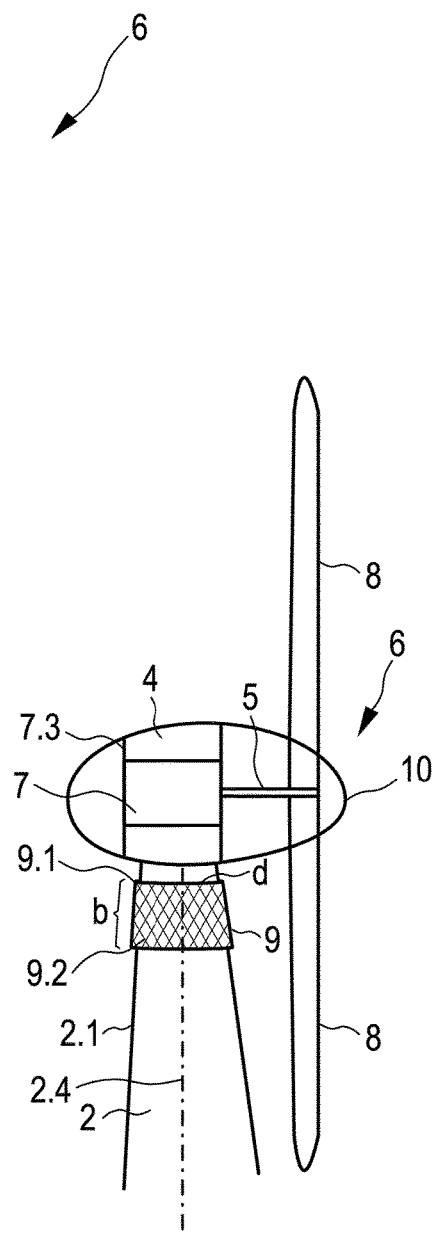
FIG. 2 a further embodiment for a wind turbine having a fiber winding.

FIG. 2 shows a further embodiment for a wind turbine having a fiber winding 9. The wind turbine 1 again comprises a tower 2, in particular a tower segment 2.1. Disposed in the nacelle 4, which is disposed above the tower, in particular the tower segment 2.1, there is a generator (represented schematically), which executes a rotary motion when the wind turbine 1 is in operation. The rotary motion of the rotor 6 in this case is transmitted to the generator 7 via a stub axle, in particular a shaft 5.

The generator is, for example, a synchronous generator, which is configured to feed a generator current directly into the electricity grid without any need for adaptation to the grid current, in particular to the grid frequency (of 50 Hz).

During operation, a periodic vibration of the synchronous generator may occur with a cogging frequency as a result of a periodically occurring detent torque. The vibration of the generator may then propagate or be transmitted to the wind turbine 1, in particular to the tower 2 of the wind turbine 1, via the suspension 7.3 of the generator, in particular via the generator feet, such that the tower 2 is excited to vibrate. These vibrations are suppressed and/or damped by means of a fiber winding 9, which is disposed on the tower 2 of the wind turbine 1, the fiber winding 9 being wound around a surface of the tower 2, radially in relation to the tower axis.

The fiber winding 9 is realized as a fibrous composite material having a matrix 9.1, for example a resin, for example thermosetting resin, thermosetting plastic, synthetic resin, elastomer and/or thermoplastic, and having a reinforced fiber 9.2 embedded in the matrix 9.1. Preferably, the fiber winding is realized with a plurality of fiber mats, and the fibers may be, for example, glass fibers, carbon fibers, ceramic fibers, aramid fibers, boron fibers, basalt fibers, steel fibers, nylon fibers and/or natural fibers, which may be oriented diagonally, parallelwise and/or perpendicularly in relation to the tower axis 2.4.

Further, the fiber winding 9 has a thickness d in the radial direction in relation to the tower axis 2.4, and has a width b in the axial direction of the tower axis 2.4.

Figure 3:
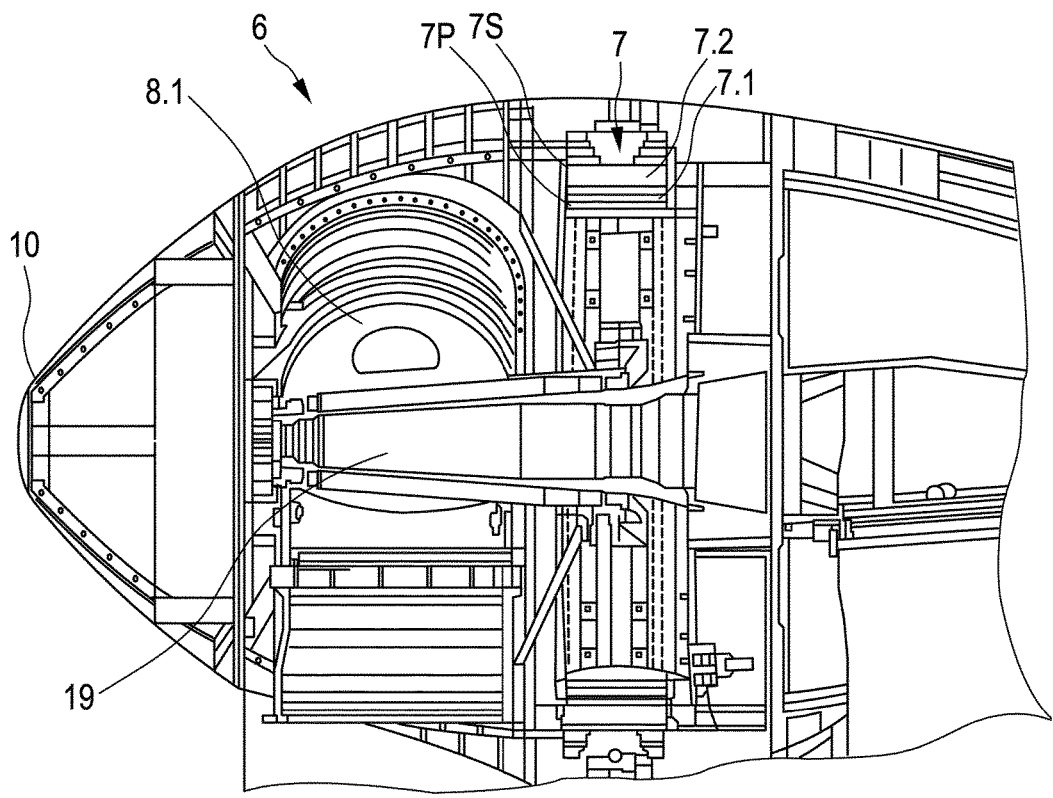
FIG. 3 a preferred exemplary embodiment for the interior of a nacelle of a wind turbine.

FIG. 3 shows a detailed representation for the interior of the nacelle 4 of a wind turbine. In particular, FIG. 3 shows a rotor 6 and a generator 7. Rotatably mounted on a stub axle 19, in particular a common shaft, are the rotor blades (not represented), via the rotor blade hub 8.1, and the generator 7, via a generator rotor 7.1. The rotary motion of the rotor 6 of the wind turbine is converted, by means of the stub axle 19, into a rotary motion of the generator rotor 7.1.

The generator is, for example, a synchronous generator, which is configured to feed a generator current directly into the electricity grid without any need for adaptation to the grid current, in particular to the grid frequency (of 50 Hz). For this purpose, the generator rotor 7.1 rotates inside the generator stator 7.2 and in so doing generates an electric current, according to the structural design of the generator 7.

Synchronous generators are typically realized with a generator rotor 7.1 and a generator stator 7.2, the generator rotor 7.1 having a magnetic field, of circumferentially disposed magnetic poles 7P, that is generated either by permanent magnets or by electromagnets. The generator stator comprises a multiplicity of coils, in particular stator windings 7S, which are configured such that, upon a rotation of the generator rotor 7.1, an alternating voltage is induced in the generator stator 7.2, in particular in the stator windings, the greater magnitude and frequency of which depends on the rotational speed of the generator rotor.

For a synchronous generator, the magnetic poles in the generator rotor 7.1 and the opposite, induced magnetic poles in the generator stator 7.2, which, depending on the alignment of the generator rotor 7.1, have the effect of sometimes attracting and sometimes repelling each other, result in a periodic detent torque, also called a "cogging torque". The detent torque may also be interpreted as a magnetic friction torque. Owing to the detent torque occurring in a periodic manner during the rotation, the synchronous generator may be excited to vibrate with a cogging frequency. The vibration of the generator may then propagate, or be transmitted, to the wind turbine, in particular to the tower of the wind turbine, via the suspension of the generator, such that the tower is excited to vibrate. The cogging frequency in this case depends on the number of magnetic poles and the rotational speed or frequency of the rotational motion.

Figure 4A:
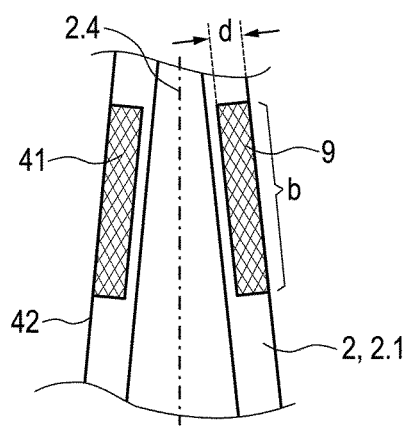
FIGS. 4A and 4B two (partial) segments of a further embodiment for a wind turbine having a fiber winding.
Figure 4B:
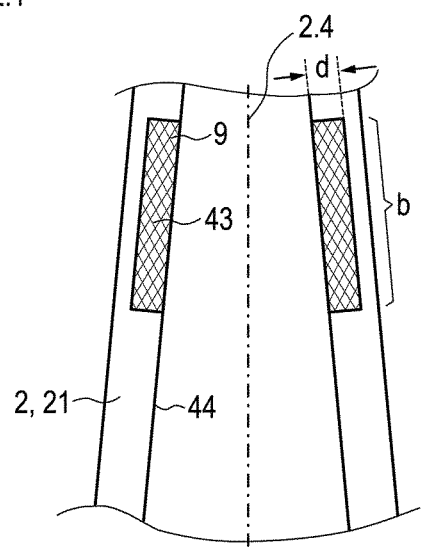

FIGS. 4A and 4B show two (partial) segments of a further embodiment for a wind turbine having a fiber winding 9, in particular a segment of a tower of the wind turbine. The fiber winding 9 has a thickness d in the radial direction in relation to the tower axis 2.4, and has a width b in the axial direction of the tower axis 2.4.

FIG. 4A shows a fiber winding 9 that is disposed in a recess 41 in a surface 42 of the tower 2, in particular of the uppermost tower segment 2.1, wherein the surface of the fiber winding 9 is flush with the surface 42 of the tower 2 in the radial direction in relation to the tower axis 2.4. It is provided in this case, in a special manner, that the fiber winding 9 is integrated into the uppermost tower segment 2.1 in the tower, in such a manner that the fiber winding does not alter the external appearance of the tower.

FIG. 4B shows a further design for a fiber winding 9, which is disposed in a recess 43 on an inner surface 44 of the tower 1, in particular of the uppermost tower segment 2.1, wherein the surface of the fiber winding 9 is flush with the inner surface 44 of the tower 2 in the radial direction in relation to the tower axis 2.4. This embodiment may be provided as an alternative and/or in addition to a fiber winding on the surface of the outside of the tower.

The invention claimed is:

1. A wind turbine comprising:
   a tower, the tower including a fiber winding wrapped around a vertical tower axis of the tower, the fiber winding being configured to damp a vibration of the tower, wherein the fiber winding is disposed in a recess in a surface of the tower, wherein a surface of the fiber winding in a radial direction in relation to the tower axis is flush with the surface of the tower;
   a nacelle;
   a generator in the nacelle; and
   a rotor disposed on the nacelle, the rotor having at least one rotor blade, wherein the rotor executes a rotary motion when the wind turbine is in operation and the rotary motion drives the generator in the nacelle.

2. The wind turbine according to claim 1, wherein the generator is a synchronous generator.

3. The wind turbine according to claim 1, wherein the fiber winding is disposed at an upper end in a direction of the vertical tower axis of the tower.

4. The wind turbine according to claim 3, wherein the tower includes a plurality of tower segments stacked on top of each other, wherein the fiber winding is disposed at an uppermost tower segment of the tower.

5. The wind turbine according to claim 1, wherein the fiber winding has a thickness in a radial direction in relation to the tower axis, wherein a dimension of the thickness is selected such that the vibration of the tower is damped, wherein the vibration is generated by the generator.

6. The wind turbine according to claim 1, wherein the fiber winding has a width in an axial direction of the tower axis, wherein a dimension of the width is selected such that the vibration of the tower is damped, wherein the vibration is generated by the generator.

7. The wind turbine according to claim 1, wherein the tower includes an uppermost tower segment that is a steel element.

8. The wind turbine according to claim 1, wherein the fiber winding is a fibrous composite material having a matrix and a reinforced fiber.

9. The wind turbine according to claim 8, wherein the matrix is a resin that is selected from at least one of the following materials: thermosetting resins, thermosetting plastics, synthetic resins, elastomers and elastomeric thermoplastics, wherein the fiber winding is a plurality of fiber mats.

10. The wind turbine according to claim 1, wherein the surface is an inner surface.

11. A wind turbine comprising:
a tower, the tower including a fiber winding wrapped around a vertical tower axis of the tower, the fiber winding being configured to damp a vibration of the tower, wherein the fiber winding is disposed in a recess on an inner surface of the tower, and a surface of the fiber winding in a radial direction in relation to the tower axis is flush with the inner surface of the tower;
a nacelle;
a generator in the nacelle; and
a rotor disposed on the nacelle, the rotor having at least one rotor blade, wherein the rotor executes a rotary motion when the wind turbine is in operation and the rotary motion drives the generator in the nacelle.

12. The wind turbine according to claim 1, wherein the fiber winding includes reinforced fibers made from at least one of the following materials: glass fibers, carbon fibers, ceramic fibers, aramid fibers, boron fibers, basalt fibers, steel fibers, nylon fibers and natural fibers, wherein the reinforced fibers are oriented at least one of diagonally, parallelwise and perpendicularly in relation to the tower axis.

13. The wind turbine according to claim 11, wherein the generator is a synchronous generator.

14. The wind turbine according to claim 11, wherein the fiber winding is disposed at an upper end in a direction of the vertical tower axis of the tower.

15. The wind turbine according to claim 11, wherein the fiber winding has a thickness in a radial direction in relation to the tower axis, wherein a dimension of the thickness is selected such that the vibration of the tower is damped, wherein the vibration is generated by the generator.

16. The wind turbine according to claim 11, wherein the fiber winding has a width in an axial direction of the tower axis, wherein a dimension of the width is selected such that the vibration of the tower is damped, wherein the vibration is generated by the generator.

17. The wind turbine according to claim 11, wherein the fiber winding is a fibrous composite material having a matrix and a reinforced fiber.

18. The wind turbine according to claim 17, wherein the matrix is a resin that is selected from at least one of the following materials: thermosetting resins, thermosetting plastics, synthetic resins, elastomers and elastomeric thermoplastics, wherein the fiber winding is a plurality of fiber mats.

19. The wind turbine according to claim 11, wherein the fiber winding includes reinforced fibers made from at least one of the following materials: glass fibers, carbon fibers, ceramic fibers, aramid fibers, boron fibers, basalt fibers, steel fibers, nylon fibers and natural fibers, wherein the reinforced fibers are oriented at least one of diagonally, parallelwise and perpendicularly in relation to the tower axis.

20. The wind turbine according to claim 11, wherein the tower includes an uppermost tower segment that is a steel element.

* * * * *